United States Patent
Miyashita

(10) Patent No.: US 11,865,968 B2
(45) Date of Patent: Jan. 9, 2024

(54) VEHICLE LAMP AND LAMP CONTROL MODULE

(71) Applicant: KOITO MANUFACTURING CO., LTD., Tokyo (JP)

(72) Inventor: Yuichi Miyashita, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/477,164

(22) Filed: Sep. 16, 2021

(65) Prior Publication Data

US 2022/0080882 A1    Mar. 17, 2022

(30) Foreign Application Priority Data

Sep. 16, 2020 (JP) ................. 2020-155749

(51) Int. Cl.
H05B 45/10 (2020.01)
B60Q 1/34 (2006.01)

(52) U.S. Cl.
CPC ............. *B60Q 1/343* (2013.01); *H05B 45/10* (2020.01)

(58) Field of Classification Search
CPC ...... B60Q 1/343; H05B 45/10; H05B 45/345; H05B 45/375; H05B 45/48
See application file for complete search history.

(56) References Cited

U.S. PATENT DOCUMENTS

| | | | |
|---|---|---|---|
| 2002/0047624 A1* | 4/2002 | Stam | H05B 47/155 315/157 |
| 2017/0182941 A1 | 6/2017 | Ohta | |
| 2019/0070998 A1* | 3/2019 | Spencer | B60Q 1/2615 |
| 2020/0236745 A1* | 7/2020 | Garrett | H05B 45/40 |
| 2020/0238890 A1* | 7/2020 | Ichikawa | H05B 45/345 |
| 2021/0039550 A1 | 2/2021 | Miyashita et al. | |

FOREIGN PATENT DOCUMENTS

| | | |
|---|---|---|
| CN | 106132152 A | 11/2016 |
| CN | 107172742 A | 9/2017 |
| CN | 107889316 A | 4/2018 |
| CN | 207854240 U | 9/2018 |
| CN | 109131053 A | 1/2019 |

(Continued)

OTHER PUBLICATIONS

Office Action issued in Indian Application No. 202114041094; dated Apr. 8, 2022 (6 pages).

(Continued)

*Primary Examiner* — Minh D A

(74) *Attorney, Agent, or Firm* — Osha Bergman Watanabe & Burton LLP

(57) ABSTRACT

A vehicle lamp includes a turn lamp, a nonvolatile memory, a signal processing device, and a drive circuit. The turn lamp includes a plurality of light emitting elements that independently controllable to be turned on and off. The nonvolatile memory stores a parameter related to control of the plurality of light emitting elements. The signal processing device generates, based on the parameter, a plurality of turn-on commands indicating turn-on states of the plurality of light emitting elements at each time point by executing a software program. The drive circuit drives each of the plurality of light emitting elements based on the plurality of turn-on commands.

8 Claims, 19 Drawing Sheets

(56) References Cited

FOREIGN PATENT DOCUMENTS

| FR | 2943011 A1 | | 9/2010 |
|---|---|---|---|
| JP | 2008292949 A | * | 12/2008 |
| JP | 2017119449 A | | 7/2017 |
| KR | 20140079153 A | | 6/2014 |
| KR | 20180043708 A | | 4/2018 |
| KR | 2019-0063673 A | | 6/2019 |
| WO | 2019-208545 A1 | | 10/2019 |

OTHER PUBLICATIONS

French Search Report issued in French Application No. 2109689 dated Feb. 20, 2023 (9 pages).

* cited by examiner

FIG. 6A

| PARAMETER | DESCRIPTION | VALUE |
|---|---|---|
| D1_1 | TURN-ON TIMING τ 1 | 0ms |
| D1_2 | TURN-ON TIMING τ 2 | 20ms |
| D1_3 | TURN-ON TIMING τ 3 | 40ms |
| D1_4 | TURN-ON TIMING τ 4 | 60ms |
| D1_5 | TURN-ON TIMING τ 5 | 80ms |
| D1_6 | TURN-ON TIMING τ 6 | 100ms |
| D1_7 | TURN-ON TIMING τ 7 | 120ms |
| D1_8 | TURN-ON TIMING τ 8 | 140ms |
| D1_9 | TURN-ON TIMING τ 9 | 160ms |
| D1_10 | TURN-ON TIMING τ 10 | 180ms |
| D1_11 | TURN-ON TIMING τ 11 | 200ms |
| D1_12 | TURN-ON TIMING τ 12 | 240ms |
| D2 | LIGHT ADJUSTMENT TIME τ 0 | 15ms |

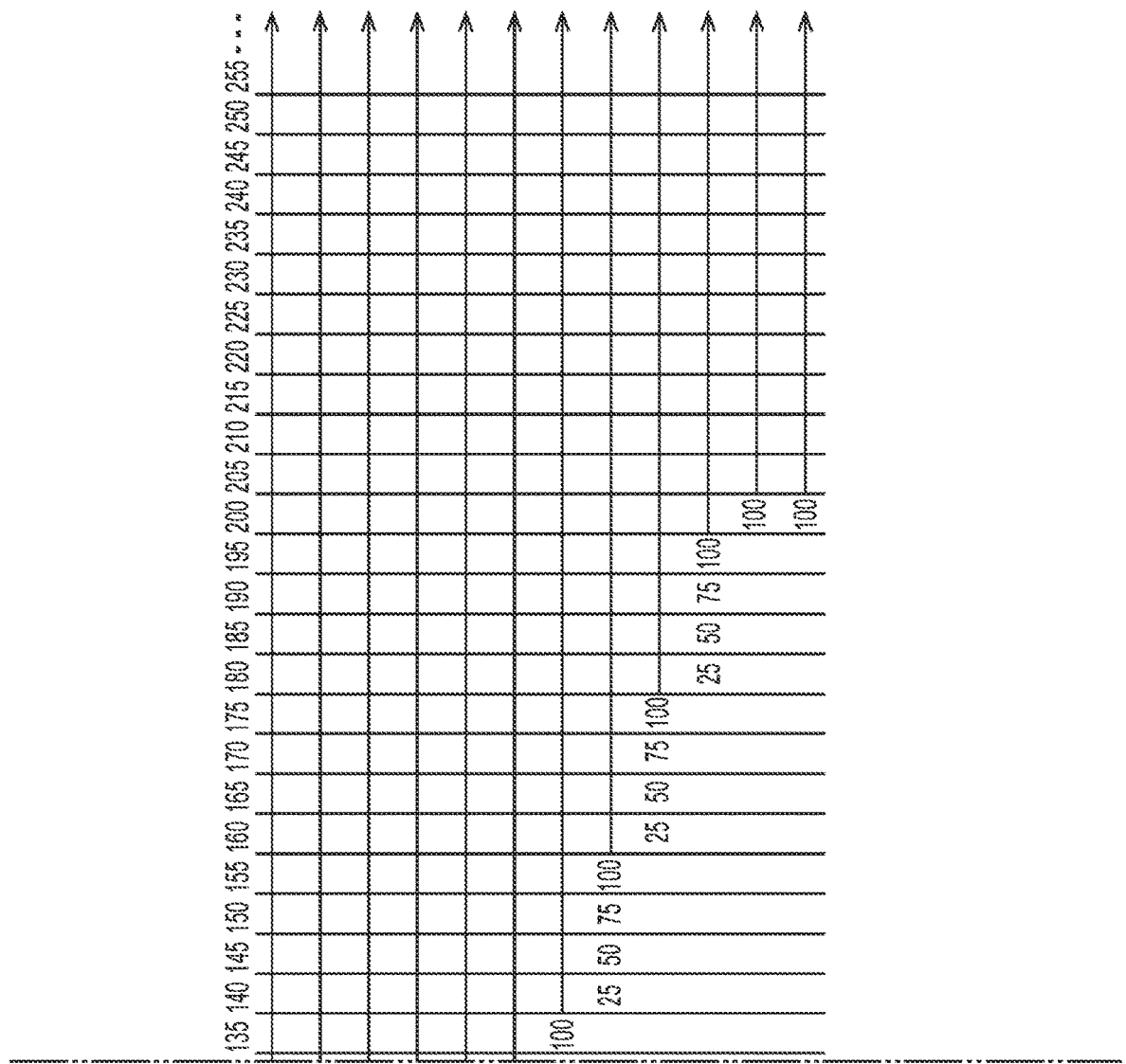
(FIG. 6B CONTINUED)

FIG. 8A

| PARAMETER | DESCRIPTION | VALUE |
|---|---|---|
| D1_1 | TURN-ON TIMING τ 1 | 0ms |
| D1_2 | TURN-ON TIMING τ 2 | 20ms |
| D1_3 | TURN-ON TIMING τ 3 | 40ms |
| D1_4 | TURN-ON TIMING τ 4 | 60ms |
| D1_5 | TURN-ON TIMING τ 5 | 80ms |
| D1_6 | TURN-ON TIMING τ 6 | 100ms |
| D1_7 | TURN-ON TIMING τ 7 | 120ms |
| D1_8 | TURN-ON TIMING τ 8 | 140ms |
| D1_9 | TURN-ON TIMING τ 9 | 160ms |
| D1_10 | TURN-ON TIMING τ 10 | 160ms |
| D1_11 | TURN-ON TIMING τ 11 | — |
| D1_12 | TURN-ON TIMING τ 12 | — |
| D2 | LIGHT ADJUSTMENT TIME τ 0 | 20ms |
| D3 | THE NUMBER OF LAMP m | 10 |

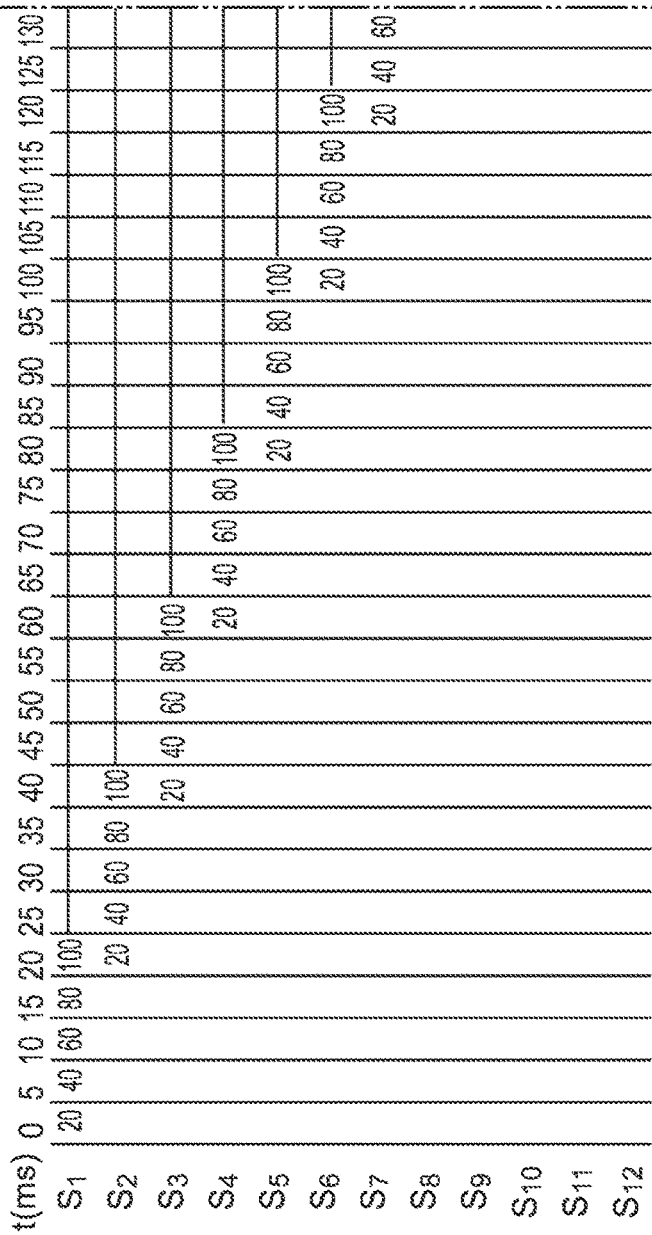

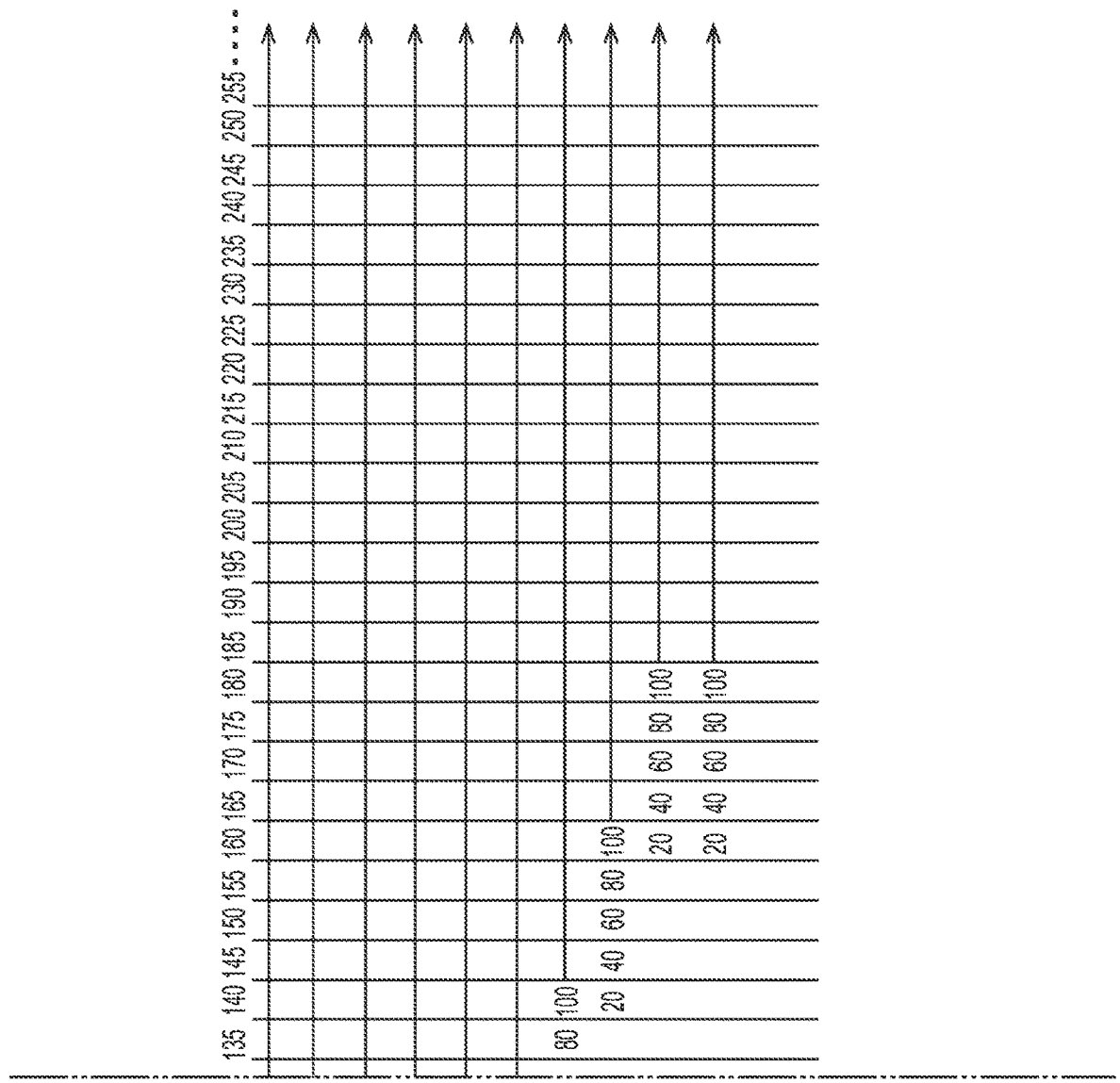
(FIG. 8B CONTINUED)

FIG. 9A

| PARAMETER | DESCRIPTION | VALUE |
|---|---|---|
| D1_1 | TURN-ON TIMING τ 1 | 0ms |
| D1_2 | TURN-ON TIMING τ 2 | 20ms |
| D1_3 | TURN-ON TIMING τ 3 | 40ms |
| D1_4 | TURN-ON TIMING τ 4 | 60ms |
| D1_5 | TURN-ON TIMING τ 5 | 80ms |
| D1_6 | TURN-ON TIMING τ 6 | 100ms |
| D1_7 | TURN-ON TIMING τ 7 | 120ms |
| D1_8 | TURN-ON TIMING τ 8 | 140ms |
| D1_9 | TURN-ON TIMING τ 9 | 160ms |
| D1_10 | TURN-ON TIMING τ 10 | 180ms |
| D1_11 | TURN-ON TIMING τ 11 | 200ms |
| D1_12 | TURN-ON TIMING τ 12 | 240ms |
| D2 | LIGHT ADJUSTMENT TIME τ 0 | 15ms |
| D3 | THE NUMBER OF LAMP m | 12 |
| D4 | MODE | 1 |

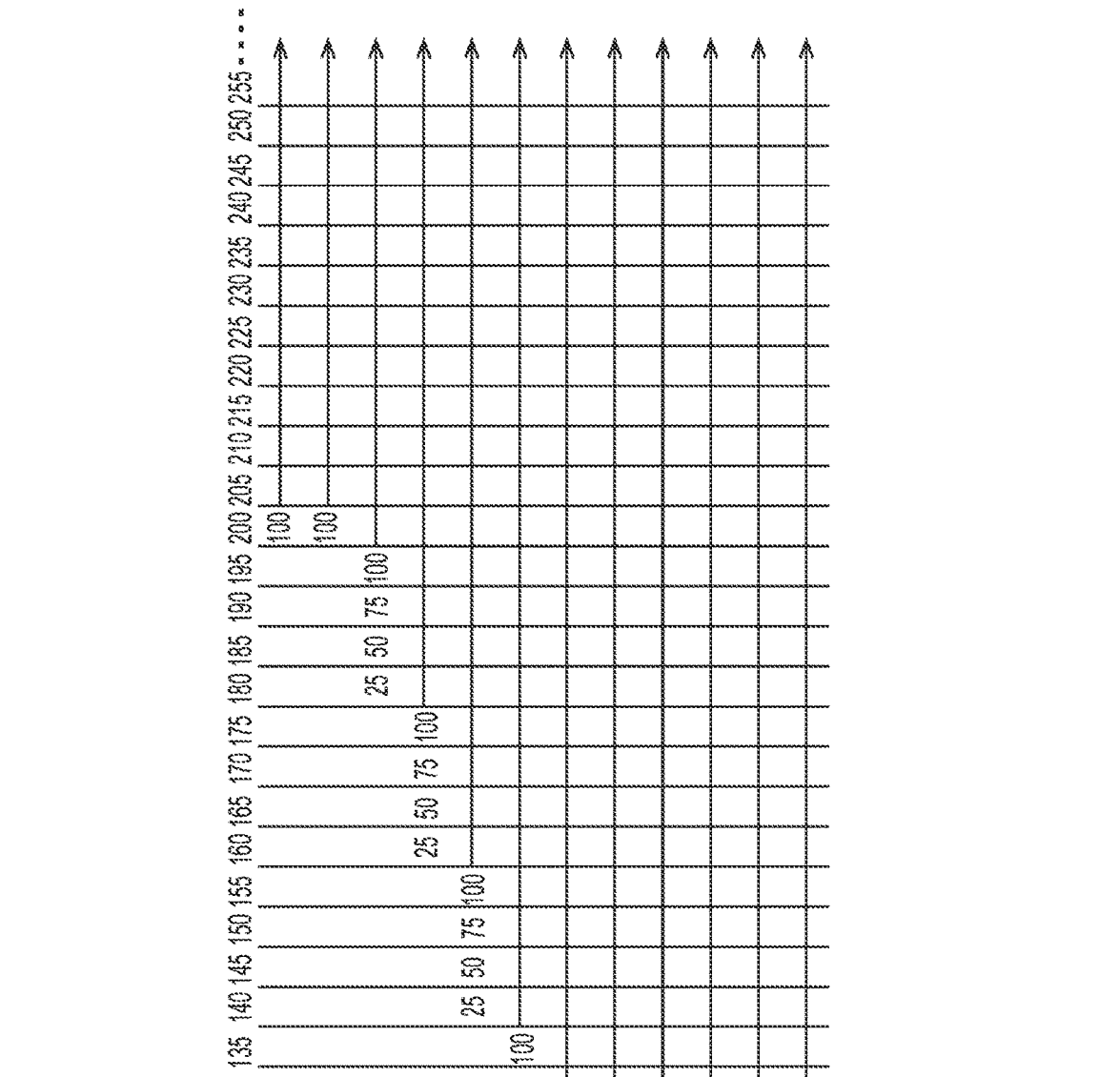
(FIG. 9B CONTINUED)

FIG. 10A

| PARAMETER | DESCRIPTION | VALUE |
|---|---|---|
| D1_1 | TURN-ON TIMING τ 1 | 0ms |
| D1_2 | TURN-ON TIMING τ 2 | 20ms |
| D1_3 | TURN-ON TIMING τ 3 | 40ms |
| D1_4 | TURN-ON TIMING τ 4 | 60ms |
| D1_5 | TURN-ON TIMING τ 5 | 80ms |
| D1_6 | TURN-ON TIMING τ 6 | 100ms |
| D1_7 | TURN-ON TIMING τ 7 | 120ms |
| D1_8 | TURN-ON TIMING τ 8 | 140ms |
| D1_9 | TURN-ON TIMING τ 9 | 160ms |
| D1_10 | TURN-ON TIMING τ 10 | 180ms |
| D1_11 | TURN-ON TIMING τ 11 | — |
| D1_12 | TURN-ON TIMING τ 12 | — |
| D2 | LIGHT ADJUSTMENT TIME τ 0 | 20ms |
| D3 | THE NUMBER OF LAMP m | 10 |
| D4 | MODE | 1 |

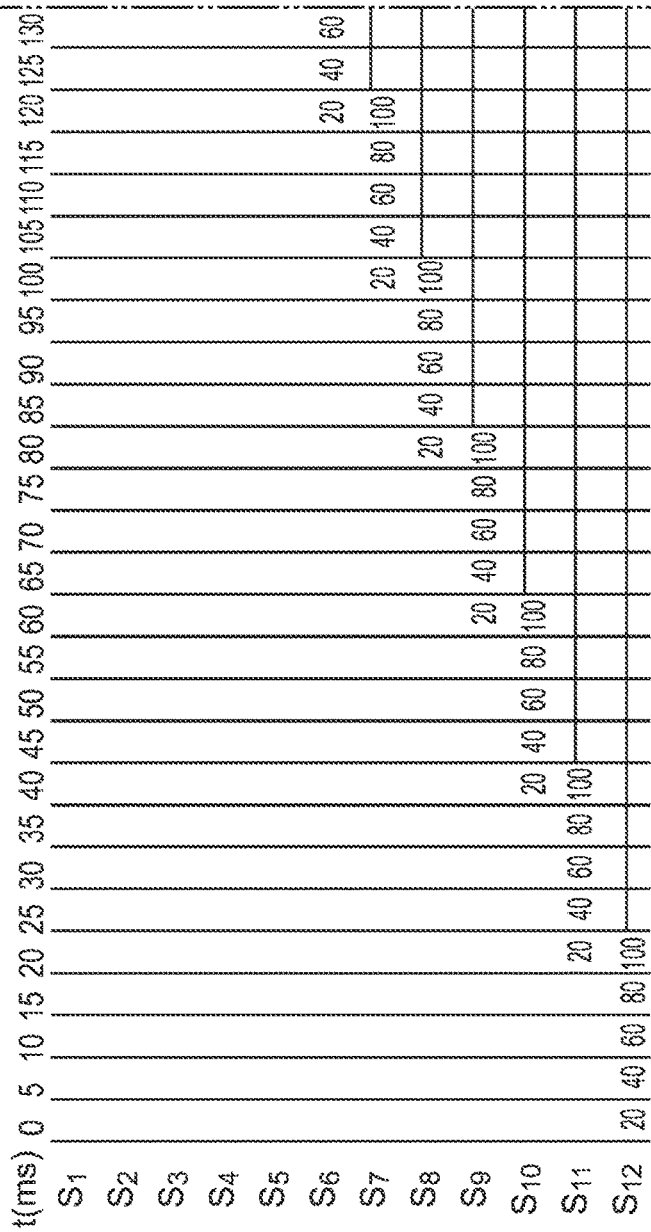

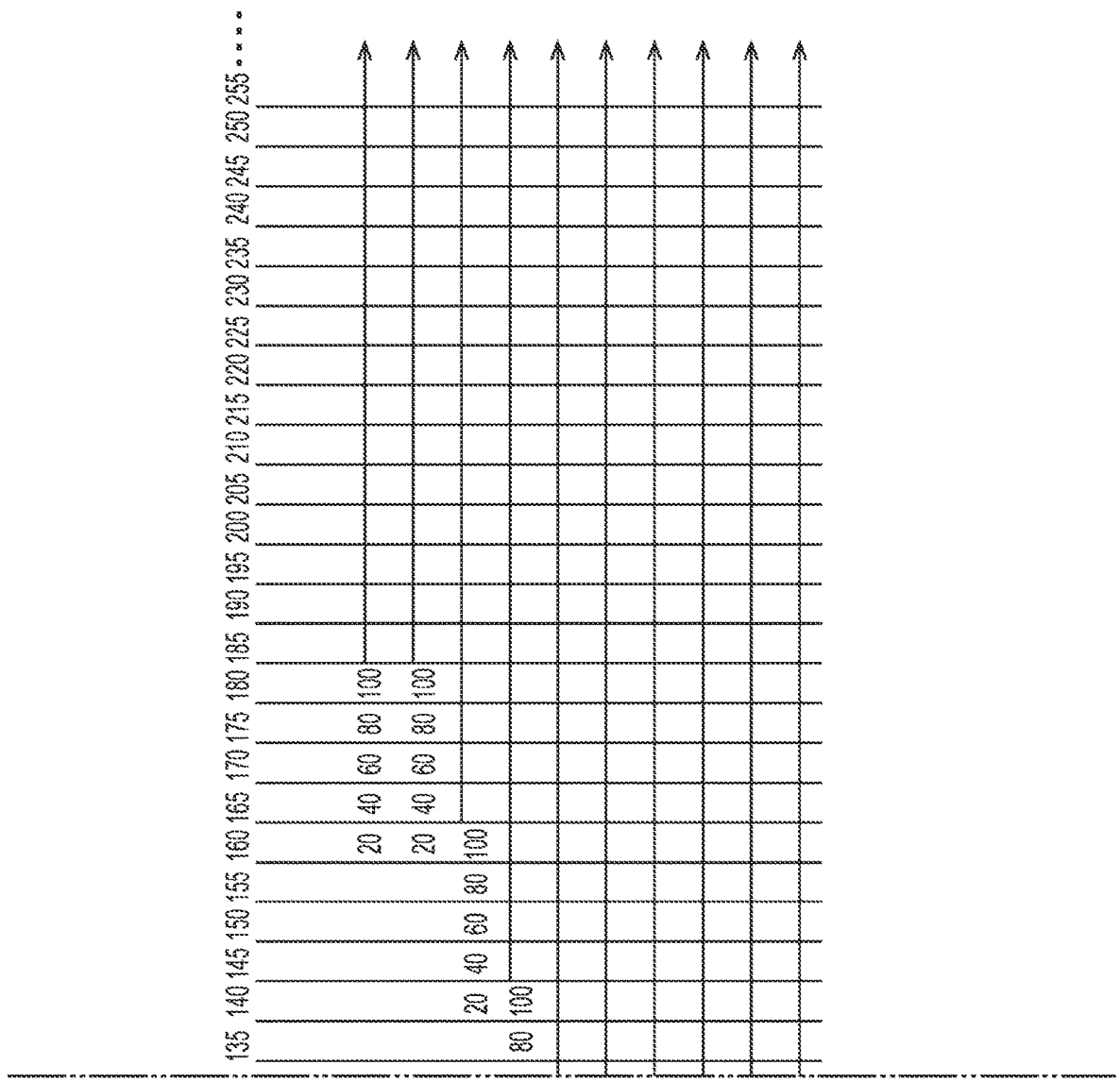
(FIG. 10B CONTINUED)

VEHICLE LAMP AND LAMP CONTROL MODULE

CROSS-REFERENCE TO RELATED APPLICATION(S)

This application is based on and claims priority under 35 USC 119 from Japanese Patent Application No. 2020-155749 filed on Sep. 16, 2020, the contents of which are incorporated herein by reference.

TECHNICAL FIELD

The present disclosure relates to a lamp used in a vehicle such as an automobile.

BACKGROUND ART

In recent years, the functionality of a vehicle lamp has been enhanced, and a headlamp is provided with a plurality of lamps having different roles, such as a low beam, a high beam, a turn signal lamp, a position lamp, and a daytime running lamp. It is necessary to cause light sources of the plurality of lamps to emit light with appropriate luminance in accordance with a control signal from a vehicle.

CITATION LIST

Patent Literature

Patent Literature 1: JP2017-119449A

In recent years, some vehicles have begun to be equipped with turn signal lamps (hereinafter, referred to as sequential turn lamps) that are sequentially turned on so as to flow in one direction. Since specifications of turn-on patterns of the turn signal lamps are defined for each vehicle, a lamp manufacturer needs to design a lamp control system according to required specifications.

SUMMARY

The present disclosure has been made in such circumstances, and an exemplary object of an aspect of the present disclosure is to provide a vehicle lamp that can deal with various turn-on patterns of a turn signal lamp.

An embodiment of the present disclosure relates to a vehicle lamp. A vehicle lamp includes a turn lamp including a plurality of light emitting elements that can be independently controlled to be turned on and off, a nonvolatile memory that stores a parameter related to control of the plurality of light emitting elements, a signal processing device configured to generate, based on the parameter, a plurality of turn-on commands indicating turn-on states of the plurality of light emitting elements at each time point by executing a software program, and a drive circuit configured to drive each of the plurality of light emitting elements based on the plurality of turn-on commands.

Another aspect of the present disclosure relates to a lamp control module used in a vehicle lamp including a turn lamp provided with a plurality of light emitting elements that can be independently controlled to be turned on and off. The lamp control module includes a nonvolatile memory that stores a parameter related to control of the plurality of light emitting elements, a signal processing device configured to generate, based on the parameter, a plurality of turn-on commands indicating turn-on states of the plurality of light emitting elements at each time point by executing a software program, and a drive circuit configured to drive each of the plurality of light emitting elements based on the plurality of turn-on commands.

It should be noted that any combination of the above components, and components and expressions of the present invention substituted by a method, a device, a system, or the like are also effective as an aspect of the present invention.

According to an aspect of the present disclosure, it is possible to blink the turn signal lamp in various modes without changing a hardware/software program.

BRIEF DESCRIPTION OF DRAWINGS

FIGS. 6A and 6B are diagrams showing a setting example 1.

FIGS. 8A and 8B are diagrams showing a setting example 2.

FIGS. 9A and 9B are diagrams showing a setting example 3.

FIGS. 10A and 10B are diagrams showing a setting example 4.

DESCRIPTION OF EMBODIMENTS

Overview of Embodiment

Figure 1:
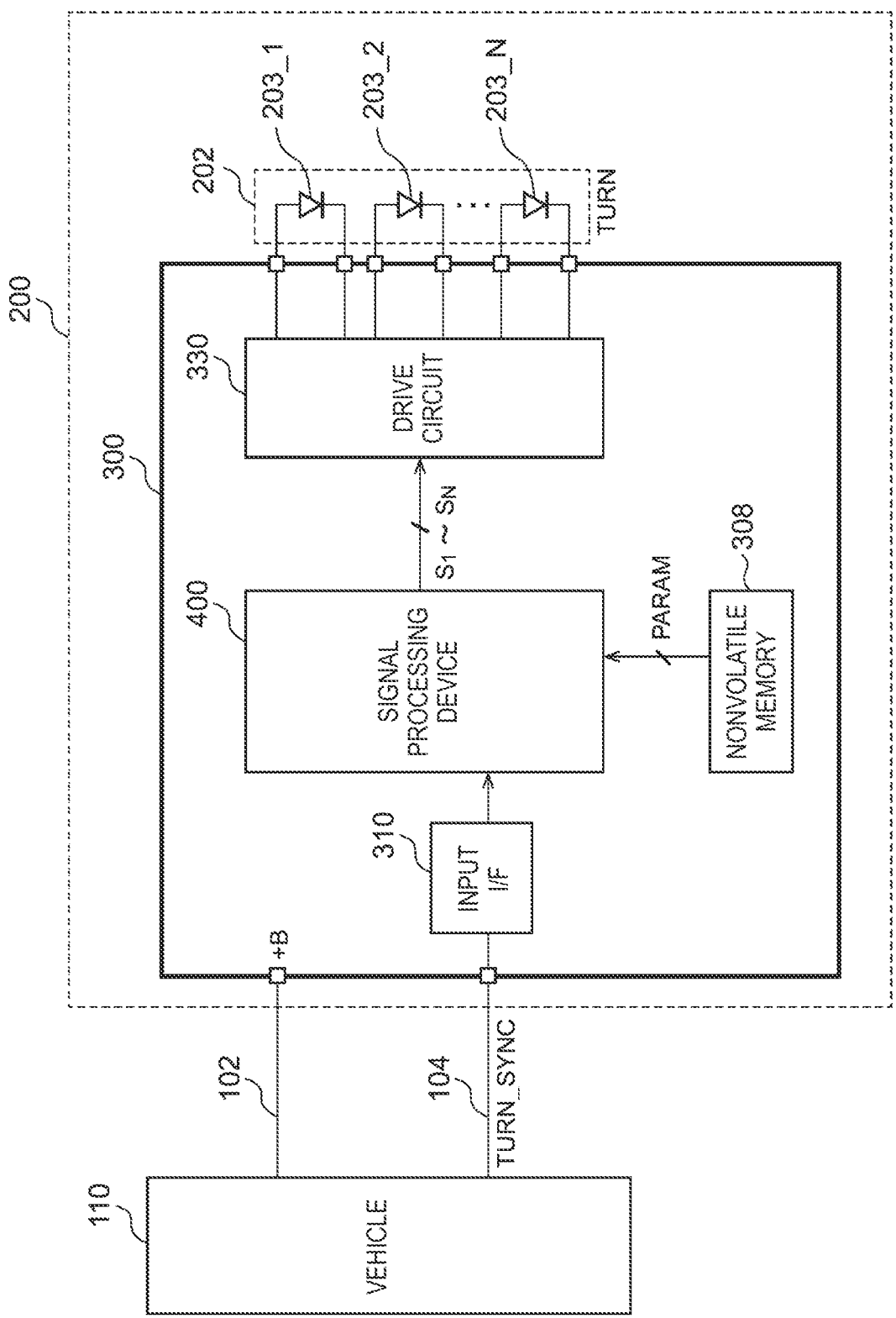
FIG. 1 is a block diagram showing a lamp system according to an embodiment.

An overview of some exemplary embodiments of the present disclosure will be described. This overview is intended to simplify and describe some concepts of one or more embodiments for the purpose of basic understanding of the embodiments, and is not intended to limit the scope of the invention or disclosure. In addition, this overview is not a comprehensive overview of all conceivable embodiments, and is not intended to limit components that are essential to the embodiments. For the sake of convenience, "one embodiment" may be used to refer to one or more embodiments disclosed in the present specification.

A vehicle lamp according to an embodiment includes a turn lamp provided with a plurality of light emitting elements that can be independently controlled to be turned on and off, and a lamp control module. The lamp control module includes a nonvolatile memory that stores parameters related to control of the plurality of light emitting elements, a signal processing device that generates a plurality of turn-on commands indicating turn-on states of the plurality of light emitting elements at respective time points based on the parameters by executes a software program, and a drive circuit that drives each of the plurality of light emitting elements based on the plurality of turn-on commands.

According to this configuration, it is possible to achieve various turn-on patterns according to the parameters in the nonvolatile memory without greatly changing the software program and hardware.

In one embodiment, the parameters may include a plurality of pieces of first data that define turn-on timing of each of the plurality of light-emitting elements as an elapsed time from a reference time point. Accordingly, a turn-on order and a turn-on time difference of the plurality of light emitting elements can be freely set.

In one embodiment, the parameters may further include second data that defines a light adjustment time starting from when luminance of the plurality of light emitting elements is 0 till when the luminance of the plurality of light emitting elements reaches a target value. The signal processing device may generate a plurality of turn-on commands indicating the luminance of the plurality of light emitting elements at each time point. Accordingly, it is possible to perform control such as gradually turning on each light emitting element or turning on each light emitting element in a short time.

In one embodiment, the drive circuit may have an output of N channels (N≥2). The parameters may include third data that defines the number in (≤N) of the plurality of light emitting elements. Accordingly, among the N channels, m channels can be used, and remaining N channels can be set as unused channels, such that the lamp control module can be used for general purposes in vehicle lamps having different numbers of light emitting elements.

In one embodiment, the drive circuit may have an output of N channels (N≥2). The lamp control module may be switchable between a first mode in which the light emitting elements are turned on in order from the first channel to the N-th channel and a second mode in which the light emitting elements are turned on in order from the N-th channel to the first channel. The parameters may further include fourth data for designating the first mode and the second mode.

In one embodiment, the plurality of light emitting elements may be connected in series. The drive circuit may include a constant current circuit that supplies a drive current to a series connection circuit of the plurality of light emitting elements, a plurality of bypass switches connected in parallel with the plurality of light emitting elements, and a controller that drives the plurality of bypass switches in accordance with the plurality of turn-on commands.

Embodiment

Hereinafter, the present invention will be described based on preferred embodiments with reference to the drawings. The same or equivalent components, members, and processings shown in the drawings are denoted by the same reference numerals, and repeated description thereof will be omitted as appropriate. The embodiments are not intended to limit the scope of the present invention and are merely used for description, and all features described in the embodiments and combinations thereof are not necessarily essential features of the present invention.

In the present specification, "a state in which a member A is connected to a member B" includes not only a case in which the member A and the member B are physically and directly connected to each other, but also a case in which the member A and the member B are indirectly connected to each other via another member that does not substantially affect an electrical connection state between the member A and the member B or that does not impair a function or an effect achieved by coupling of the member A and the member B.

Similarly, "a state in which the member C is provided between the member A and the member B" includes not only a case in which the member A and the member C or the member B and the member C are directly connected to each other, but also a case in which the member A and the member C or the member B and the member C are indirectly connected to each other via another member that does not substantially affect an electrical connection state between the member A and the member C or the member B and the member C or does not impair a function or an effect achieved by coupling of the member A and the member C or the member B and the member C.

FIG. 1 is a block diagram showing a lamp system 100 according to an embodiment. The lamp system 100 includes a vehicle 110 and a vehicle lamp (headlamp) 200. The vehicle 110 includes an electronic control unit (ECU) or a battery on a vehicle side, a switch of each lamp, and the like.

The vehicle lamp 200 has functions of a low beam (Lo), a high beam (Hi), a daytime running lamp (DRL), a position lamp (POS), a turn signal lamp (TURN), and the like. FIG. 1 shows only a configuration related to the turn signal lamp TURN.

The vehicle lamp 200 includes a plurality of light emitting elements 203_1 to 203_N (N≥2) and a lamp control module 300. A turn signal lamp light source 202 includes the plurality of light emitting elements 203_1 to 203_N.

The light emitting elements 203_1 to 203_N are semiconductor light emitting elements such as a light emitting diode (LED) and a laser diode (LD).

Examples of the semiconductor light emitting elements include a white light emitting diode (LED), a laser diode, and an organic Electro-Luminescence (EL) element. The number N of the light emitting elements 203 may be determined in consideration of brightness or a design required for the turn signal lamp light source 202, and is not particularly limited.

A power supply voltage +B is supplied from the vehicle 110 to the vehicle lamp 200 via a power supply line 102.

A turn synchronization signal TURN_SYNC that is a turn-on command of a turn signal lamp 201 is input from the vehicle 110 to the vehicle lamp 200 via a Zika line 104. The turn synchronization signal TURN_SYNC is a signal for instructing blinking of the turn signal lamp 201. When the turn signal lamp 201 blinks, the turn synchronization signal TURN_SYNC is a pulse signal in which a high level and a low level are alternately repeated in a predetermined cycle, and a high section corresponds to turning-on and a low section corresponds to turning-off. When the turn signal lamp 201 is in a non-blinking state (turn-off state), the turn synchronization signal TURN_SYNC is fixed to be low.

The lamp control module 300 includes a nonvolatile memory 308, an input interface circuit 310, a drive circuit 330, and a signal processing device 400. Main components of the lamp control module 300 are housed in one housing and modularized.

The input interface circuit 310 receives the turn synchronization signal TURN_SYNC. For example, the input interface circuit 310 may be configured by a simple buffer.

The signal processing device 400 includes a processor that can execute a software program. The signal processing device 400 may be configured by a microcontroller, a central processing unit (CPU), a digital signal processor (DSP), or the like.

The nonvolatile memory 308 stores parameters PARAM related to control of the plurality of light emitting elements 203_1 to 203_N constituting the turn signal lamp 201.

The signal processing device 400 executes the software program to generate a plurality of turn-on commands $S_1$ to $S_N$ indicating turn-on states of the plurality of light emitting elements 203_1 to 203_N at each time point (control cycle)

based on the parameter PARAM, and supplies the turn-on commands $S_1$ to $S_N$ to the drive circuit 330.

The drive circuit 330 drives the plurality of light emitting elements 203_1 to 203_N based on the plurality of turn-on commands $S_1$ to $S_N$. The i-th turn-on command $S_i$ indicates ON and OFF of the light emitting element 203_i at each time point. The i-th turn-on command $S_i$ may indicate luminance of the light emitting element 203_i at each time point in a state in which the light emitting element 203_i is turned on.

The parameters will be described. The parameters PARAM include a plurality of pieces of first data D1_1 to D1_N that define turn-on timing of the plurality of light emitting elements 203_1 to 203_N as elapsed times $\tau_1$ to $\tau_N$ from a reference time point $t_{REF}$. The reference time point $t_{REF}$ may coincide with a time point of a positive edge of the turn synchronization signal TURN_SYNC, or may be after a predetermined time from the positive edge.

A relationship of $\tau_i \leq \tau_j$ may be imposed on i<j as a constraint condition. Accordingly, an order in which the turn-on commands $S_1$ to $S_N$ change is not changed, and thus the software program executed by the signal processing device 400 can be simplified.

Furthermore, the parameters PARAM may further include second data. D2 that defines a light adjustment time $\tau_0$ starting from when luminance of the plurality of light-emitting elements 203_1 to 203_N is 0 till when the luminance of the plurality of light-emitting elements 203_1 to 203_N reaches a target value. In this case, the plurality of turn-on commands $S_1$ to $S_N$ indicate the luminance of the plurality of light emitting elements 203_1 to 203_N at each time point. In the following description, the luminance at the time of turning-off is 0% and the luminance at the time of turning-on is 100%.

The configuration of the lamp system 100 has been described above. Next, an operation of the lamp system 100 will be described.

Figure 2:
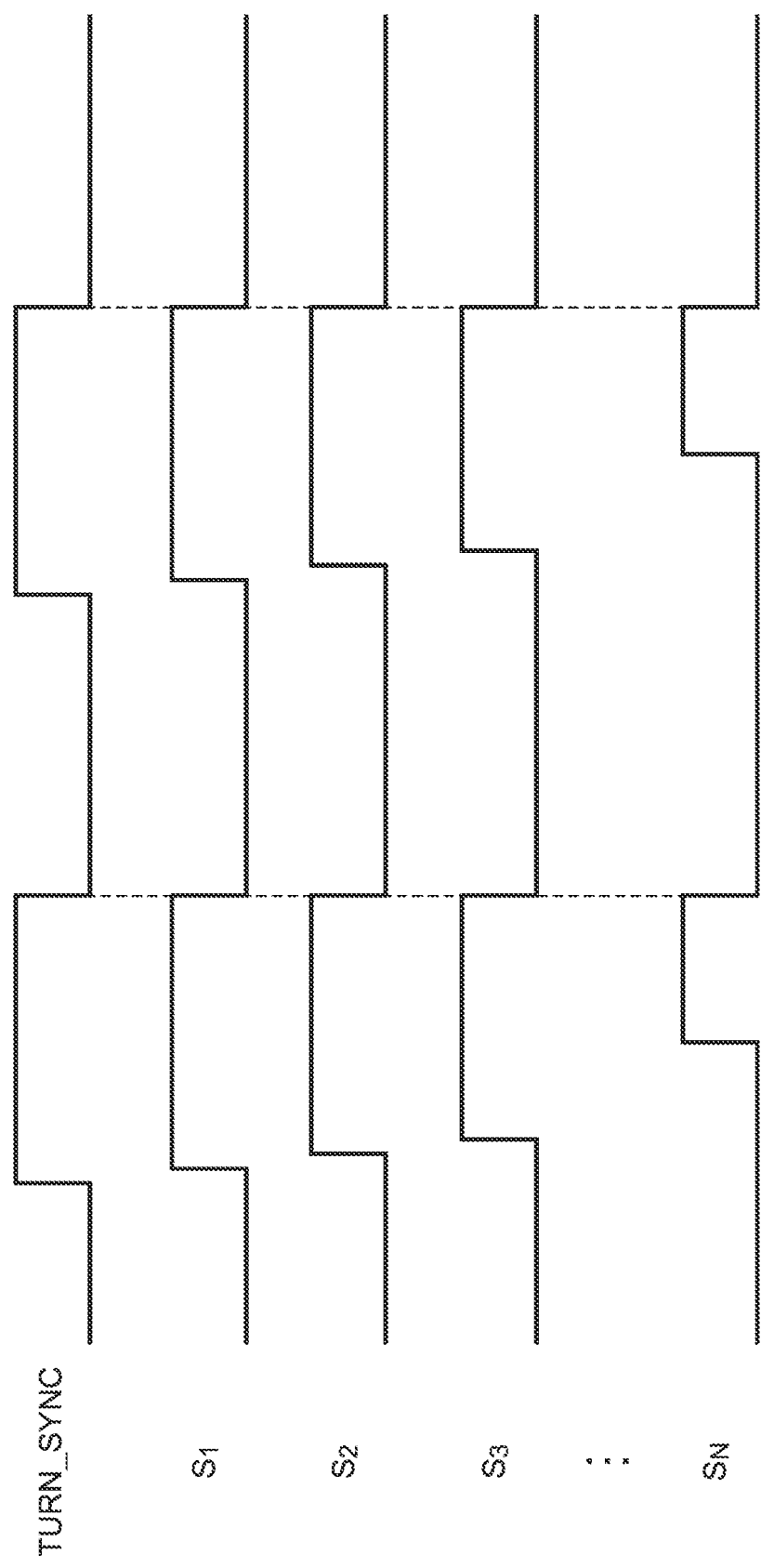
FIG. 2 is a diagram showing blinking of a turn signal lamp.

FIG. 2 is a diagram showing blinking of the turn signal lamp. The turn synchronization signal TURN_SYNC is alternately repeated at high and low in a predetermined cycle.

When the turn synchronization signal TURN_SYNC transitions to high, the vehicle lamp 200 generates a plurality of turn-on commands $S_1$ to $S_N$ in accordance with the parameters PARAM, and turns on the light emitting elements 203_1 to 203_N. In this example, a state in which the plurality of light emitting elements 203_1 to 203_N are turned on in this order is shown.

Subsequently, when the turn synchronization signal TURN_SYNC transitions to low, the vehicle lamp 200 switches the plurality of turn-on commands $S_1$ to $S_N$ to an OFF state at the same time, and turns off the light emitting elements 203_1 to 203_N.

Figure 3:
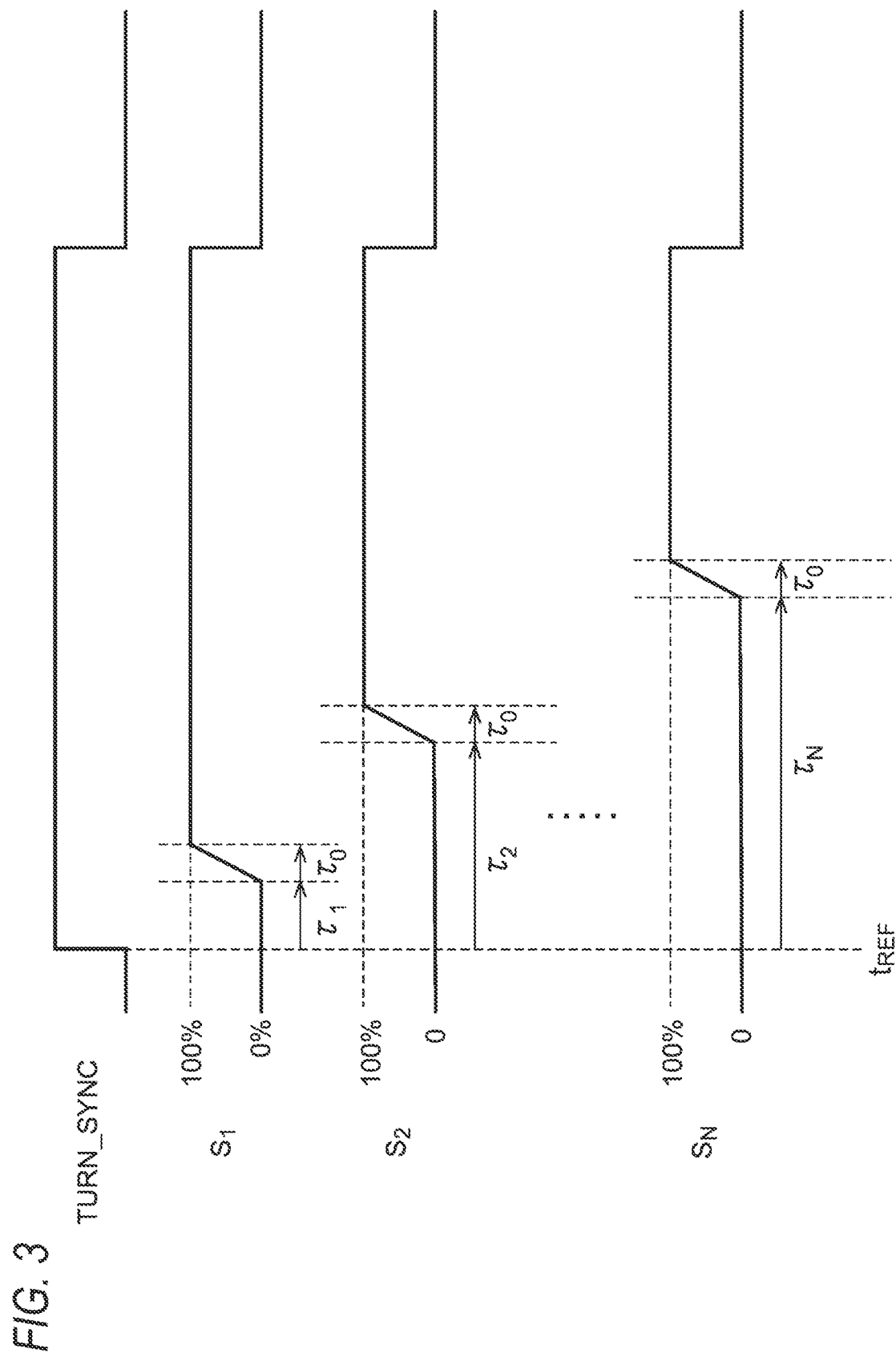
FIG. 3 is a diagram showing parameters PARAM.
Figure 4A:
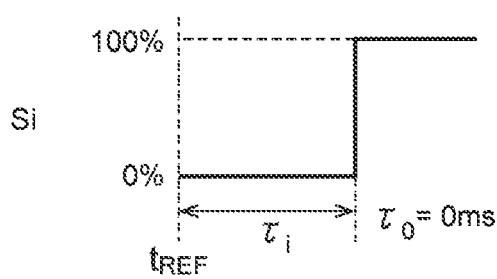
FIGS. 4A to 4E are diagrams showing light adjustment time $\tau_0$.
Figure 4B:
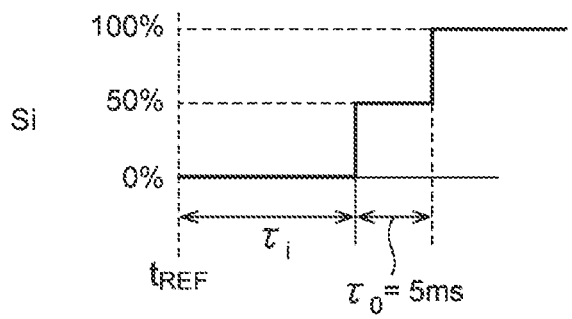
Figure 4C:
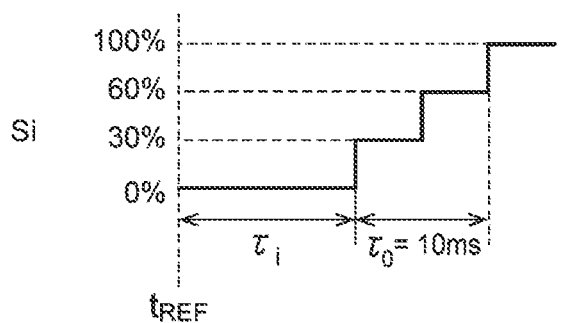
Figure 4D:
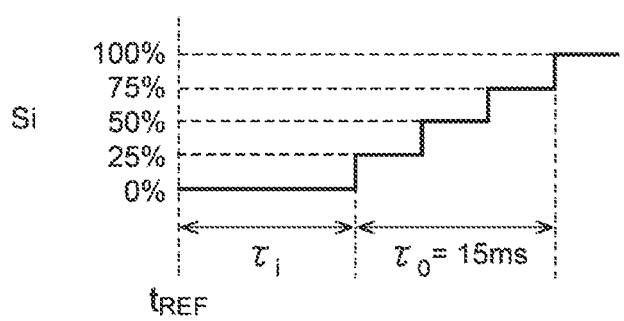
Figure 4E:
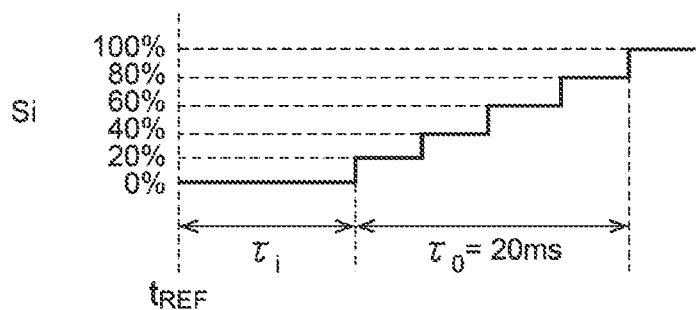

FIG. 3 is a diagram showing the parameters PARAM. For example, elapsed times $\tau_1$ to $\tau_N$ can be designated in a step of 5 ms in a range of 0 to 200 ms. The 5 ms is referred to as a control cycle. The light adjustment time $\tau_0$ can be designated in a step of $\Delta t=5$ ms from 0 to 20 ms. The reference time point $t_{REF}$ may coincide with timing of the positive edge of the turn synchronization signal TURN_SYNC.

In this example, the turn-on commands $S_1$ to $S_N$ indicates luminance. The i-th turn-on command $S_i$ is 0 (that is, turned off) in a period starting from the reference time point $t_{REF}$ till a time $\tau i$ indicated by the first data D1_i elapses. After the time $\tau_i$ elapses from the reference time point $t_{REF}$, the turn-on command $S_i$ starts to increase from 0%, and reaches a maximum value of 100% after the light adjustment time $\tau_0$ designated by the second data D2 elapses. Then, the turn-on command $S_i$ returns to 0% when the turn synchronization signal TURN_SYNC transitions to low.

FIGS. 4A to 4E are diagrams showing the light adjustment time $\tau_0$. FIGS. 4A to 4E respectively show the turn-on command $S_i$ when the light adjustment time $\tau_0=0$ ms, 5 ms, 10 ms, 15 ms, 20 ms. When $m=\tau_0/\Delta t$, the turn-on command $S_i$ increases by $\Delta x=100/m$ (%) each time $\Delta t$ elapses.

The signal processing device 400 may execute the software program to generate the turn-on command $S_i$ by the following processing.

The positive edge of the turn synchronization signal TURN_SYNC is used as a trigger to generate a count value cnt that counts up over time.

When the count value cnt is smaller than the time $\tau_i$, $S_i=0$.

When the count value cnt is larger than the time $\tau_i$ and smaller than $\tau_i+\tau_0$, the turn-on command $S_i$ increases by $\Delta x$ each time $\Delta t$ elapses.

When the count value cnt reaches $\tau_i+\tau 0$, the turn-on command $S_i$ is fixed to 100% after $\tau_i+\tau_0$. Then, $S_i$ is reset to 0% with a negative edge of the turn synchronization signal TURN_SYNC serving as a trigger.

The lamp control module 300 may have a forced turn-on function. The lamp control module 300 forcibly sets the turn-on commands $S_1$ to $S_N$ to a maximum luminance value (100%) after a predetermined time $\tau_{MAX}$ (for example, 200 ms) elapses. The predetermined time $\tau_{MAX}$ is defined as a constant in the software program, and may be changed as one of the parameters PARAM.

The operation of the vehicle lamp 200 has been described above. According to the vehicle lamp 200, various turn-on patterns can be achieved in accordance with the parameters PARAM of the nonvolatile memory 308 without greatly changing the software program and the hardware.

Next, a more specific configuration example of the vehicle lamp 200 will be described.

Figure 5:
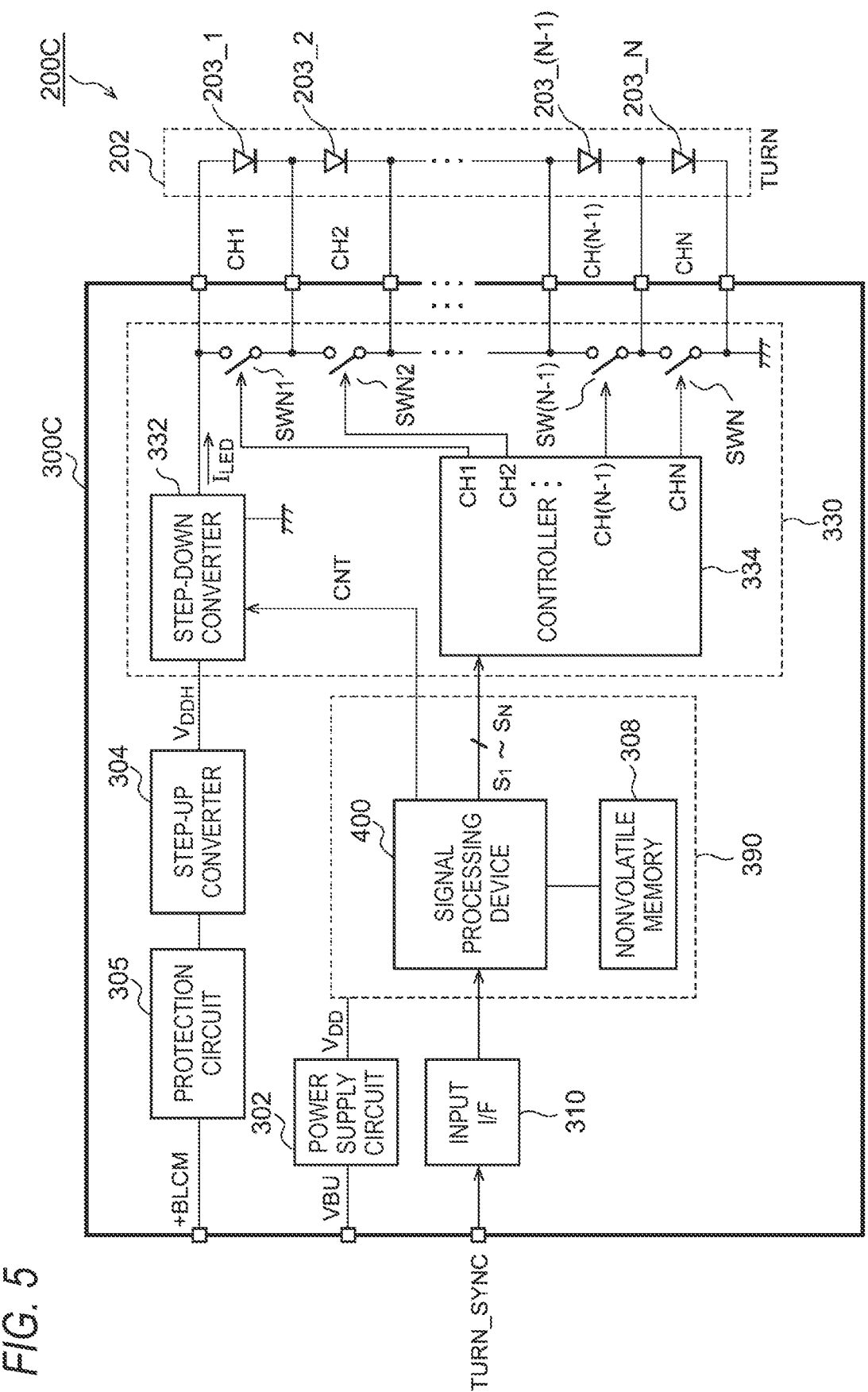
FIG. 5 is a block diagram showing a specific configuration example of a vehicle lamp.

FIG. 5 is a block diagram showing a specific configuration example of a vehicle lamp 200C. The vehicle lamp 200C includes a lamp control module 300C and the turn signal lamp light source 202.

A power supply circuit 302 receives a voltage VBU and generates a power supply voltage $V_{DD}$ of about 5 V. The power supply voltage $V_{DD}$ is supplied to a microcontroller 390 and other circuits.

A protection circuit 305 includes a diode for preventing a reverse connection, a Zener diode for preventing surge, and the like, and protects the vehicle lamp 200C from a main power supply voltage +BLCM.

A power supply circuit 304 is a step-up DC/DC converter, and steps up the power supply voltage +BLCM from the vehicle to generate a high power supply voltage $V_{DDH}$ of, for example, about 60 V.

The signal processing device 400 and the nonvolatile memory 308 described above are built in the microcontroller 390.

The lamp control module 300 has an output of N channels (N≥2) and can drive N first light emitting elements 203_1 to 203_N.

The drive circuit 330 includes a step-down converter 332, a plurality of bypass switches SW1 to SWN, and a controller 334. The controller 334 may be an application specific integrated circuit (ASIC) that controls the bypass switches SW1 to SWN.

The step-down converter 332 is of a constant current output type and generates a drive current $I_{LED}$. The step-down DC/DC converter 332 receives a control signal CNT1 from the signal processing device 400. The control signal CNT1 may include an enable signal EN1_BUCK for designating operation and stopping of the step-down converter 332. The control signal CNT1 may include a light adjustment signal CURRENT_PWM1 for designating a target amount of the drive current $I_{LED}$. The step-down DC/DC converter 332 is in an operating state when the enable signal EN_BUCK1 is asserted (for example, high), and generates the drive current $I_{LED1}$ having a current amount corresponding to the light adjustment signal CURRENT_PWM1. For example, the light adjustment signal CURRENT_PWM1 is a PWM signal, and a controller IC of the step-down DC/DC converter 332 detects a duty cycle of the light adjustment signal CURRENT_PWM1 and changes a current amount of the drive current $I_{LED1}$ according to the duty cycle (analog light adjustment). The signal processing device 400 asserts the enable signal EN_BUCK1 when the pulsed turn synchronization signal TURN_SYNC is input.

The plurality of bypass switches SW1 to SWN are connected in parallel with the plurality of light emitting elements 203_1 to 203_N. The drive circuit 330 controls the bypass switches SW1 to SWN based on the plurality of turn-on commands $S_1$ to $S_N$ generated by the signal processing device 400.

When the bypass switch SWi is turned on, the drive current $I_{LED}$ bypasses the bypass switch SWi, so that the light emitting element 203_i connected in parallel with the bypass switch SWi is turned off. When the bypass switch SWi is turned off, the drive current $I_{LED}$ flows to the light-emitting element 203_i connected in parallel with the bypass switch SWi, so that the light emitting element 203_i is turned on. The luminance of the light emitting element 203_i is controlled by a PWM light adjustment in accordance with the duty cycle of the bypass switch SWi. When the turn-on command $S_i$ is 0% to 100%, the bypass switch SWi is controlled by a duty cycle $(100-S_i)\%$ corresponding to a complement of the turn-on command $S_i$.

The signal processing device 400 and the controller 334 are connected to each other via a vehicle bus such as a controller area network (CAN), and the turn-on commands $S_1$ to $S_N$ are input to the controller 334 as CAN signals. Each of the turn-on commands $S_1$ to $S_N$ may be data that becomes 1 during a turning-on period and becomes 0 during a turning-off period under the PWM control. In this case, the controller 334 may turn off the bypass switch SWi when the received turn-on command $S_i$ is 1, and turn on the bypass switch SWi when the received turn-on command $S_i$ is 0.

Next, an operation of the vehicle lamp 200C shown in FIG. 5 will be described. Next, a setting example of parameters of the vehicle lamp 200C shown in FIG. 5 will be described. In the following description, N=12.

Figure 6B:
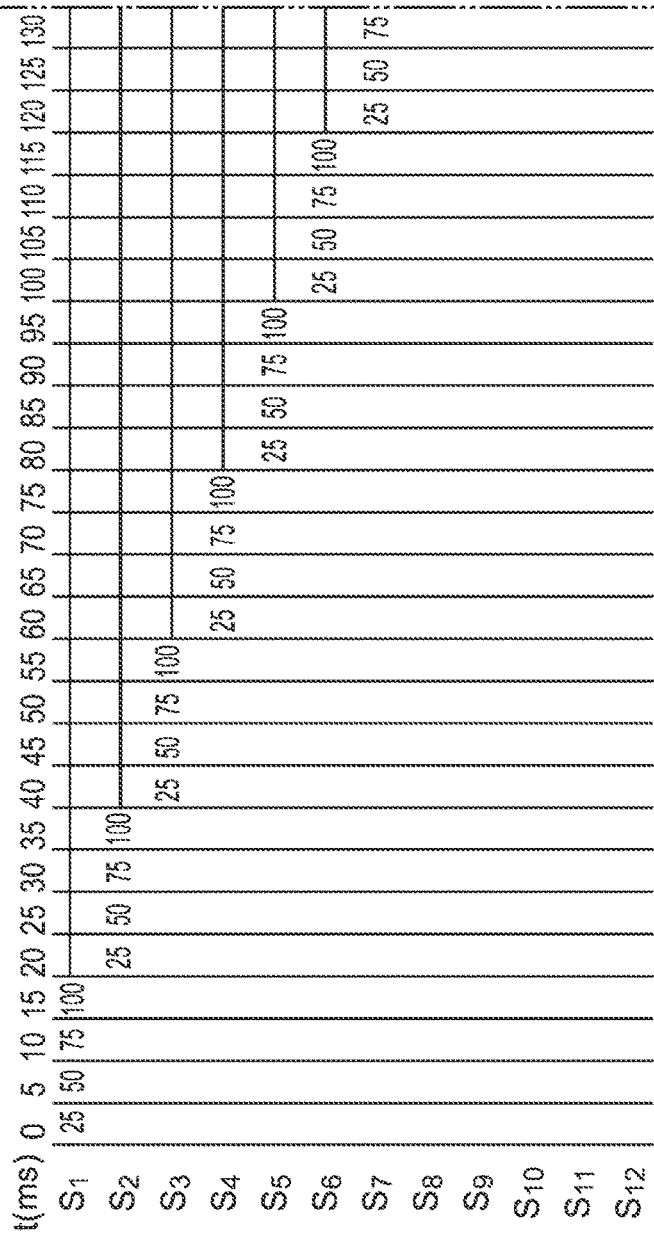

FIGS. 6A and 6B are diagrams showing a setting example 1. FIG. 6A shows values of the parameters. FIG. 6B shows a turn-on pattern based on the parameters shown in FIG. 6A. t=0 ms represents a reference time point.

In this setting example, $\tau_0$=15 ms, and the plurality of turn-on commands $S_1$ to $S_{12}$ gradually change with a time difference of 20 ms. The forced turn-on function described above forcibly sets $S_{11}$ and $S_{12}$ to 100% after 200 ms elapses from the reference time point.

As described above, according to the vehicle lamp 200C, the plurality of light emitting elements 203_1 to 203_N can be turned on in this order.

When the lamp control module 300C can drive the light emitting elements 203_1 to 203_m the number of which (m) is smaller than the number N of channels, the versatility of the lamp control module 300C is further improved.

Figure 7:
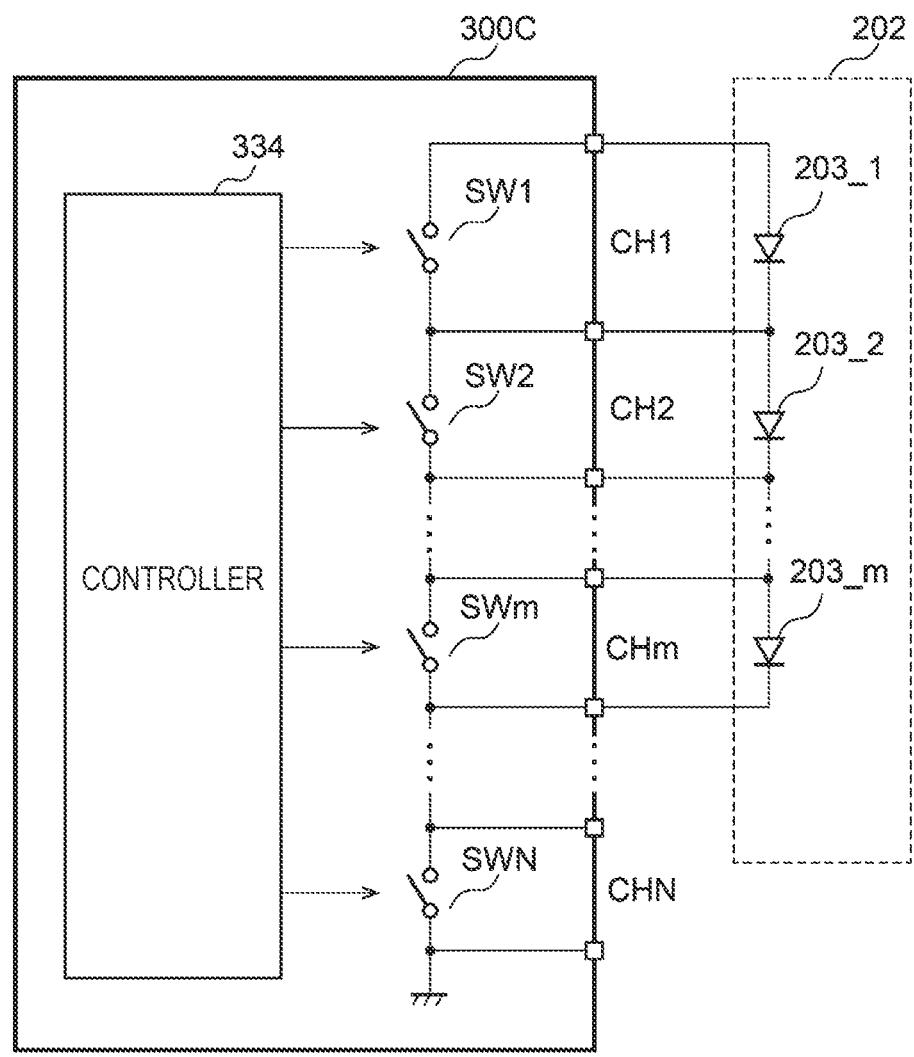
FIG. 7 is a circuit diagram showing a configuration example of the vehicle lamp when m<N.

Therefore, the parameters PARAM may include third data D3 that defines the number in of the plurality of light emitting elements 203 to be actually driven. FIG. 7 is a circuit diagram showing a configuration example of the vehicle lamp 200C when m<N. Among all channels CH1 to CHN, m light-emitting elements 203_1 to 203_m are connected to the channels CH1 to CHm, and the remaining channels CH(m+1) to CHN are unused channels.

The signal processing device 400 fixes the turn-on commands $S_{m+1}$ to $S_N$ of the unused channels to a value (0%) corresponding to OFF. Accordingly, the bypass switches SW(m+1) to SWN of the unused channels are fixedly turned on.

FIGS. 8A and 8B are diagrams showing a setting example 2. In this setting example, the number of lamps in is designated to 10 by the third data D3. $\tau_0$=20 ms, and the plurality of turn-on commands $S_1$ to $S_9$ gradually change with a time difference of 20 ms.

The turn-on timing $\tau_i$ and $\tau_j$ among the plurality of turn-on timing may be set to be equal to each other, and in this case, the light emitting elements 203_i and 203_j among the plurality of light emitting elements can be turned on at the same time. In the setting example 2, $\tau_9 = \tau_{10}$, the turn-on commands $S_9$ and $S_{10}$ have the same waveform, and the light emitting elements 203_9 and 203_10 are turned on at the same time.

The lamp control module 300C may be switchable between a first mode in which the lamp control module 300C turns on the light emitting elements in order from the first channel CH1 toward the N-th channel CHN and a second mode in which the lamp control module 300C turns on the light emitting elements in order from the N-th channel CHN toward the first channel CH1. The parameters PARAM may include fourth data D4 for designating the first mode and the second mode. The first mode is designated when the fourth data D4 has a first value (for example, 0), and the second mode is designated when the fourth data D4 has a second value (for example, 1).

When the fourth data D4 has the first value, as described above, a plurality of first data D1_1 to D1_m (that is, the turn-on timing $\tau_1$ to $\tau_m$) are associated with the turn-on commands $S_1$ to $S_m$ of the first channel CH1 to the m-th channel in this order. The i-th first data D1_i, that is, the turn-on timing $\tau_i$ is used to generate the turn-on command $S_i$ of the i-th channel.

When the fourth data D4 has the second value, the plurality of first data D1_1 to D1_m (that is, the turn-on timings $\tau_1$ to $\tau_m$) are associated with the turn-on commands $S_N$ to $S_{M-n+1}$ of the Nth channel CHN to the (M−n+1)-th channel in this order. The first channel CH1 to the (M−n)-th channel CH(M−n) are unused channels. The i-th first data DU, that is, the turn-on timing $\tau_i$ is used to generate the turn-on command $S_{N-i+1}$ of the (N−i+1)-th channel.

Figure 9B:
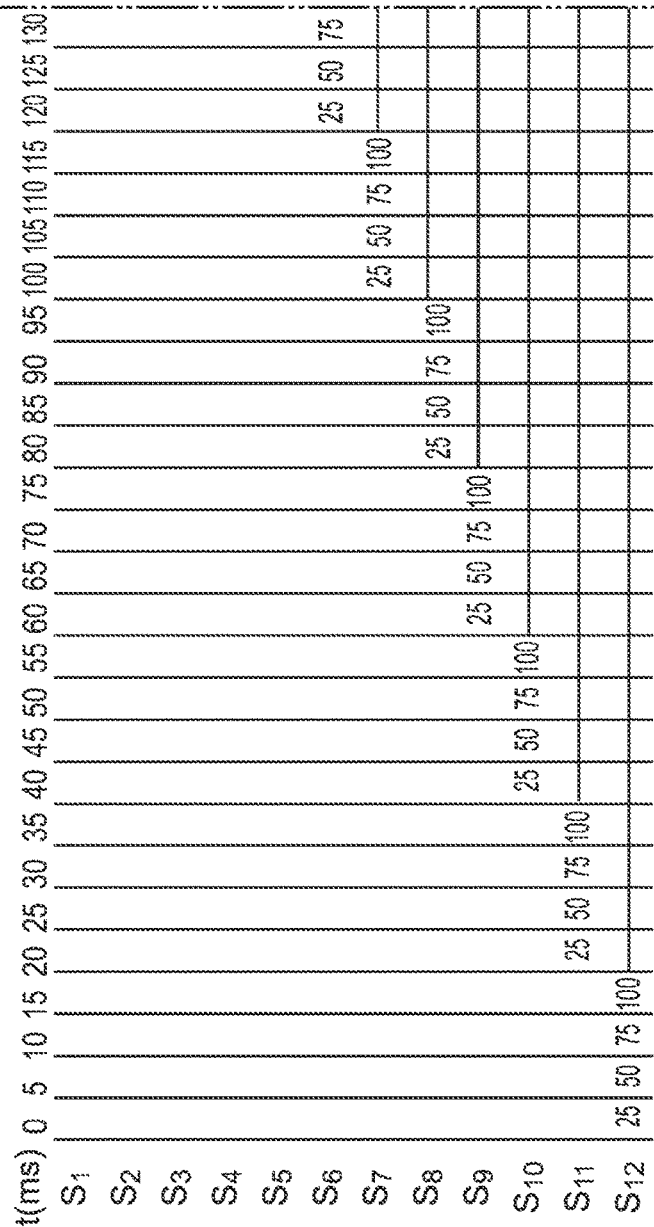

FIGS. 9A and 9B are diagrams showing a setting example 3. Regarding the first data D1, the setting example 3 is the same as the setting example 1, and the newly added fourth data D4 has the second value. In this case, the plurality of turn-on commands $S_1$ to $S_{12}$ change in a reverse order of the setting example 1 shown in FIG. 6B, and the light emitting element 203_12 of the 12th channel CH12 is turned on first, and the light emitting element 203_1 of the first channel CH1 is turned on last.

FIGS. 10A and 10B are diagrams showing a setting example 4. Regarding the first data D1 to the third data D3, the setting example 4 is the same as the setting example 2, and the newly added fourth data D4 has the second value.

Figure 11:
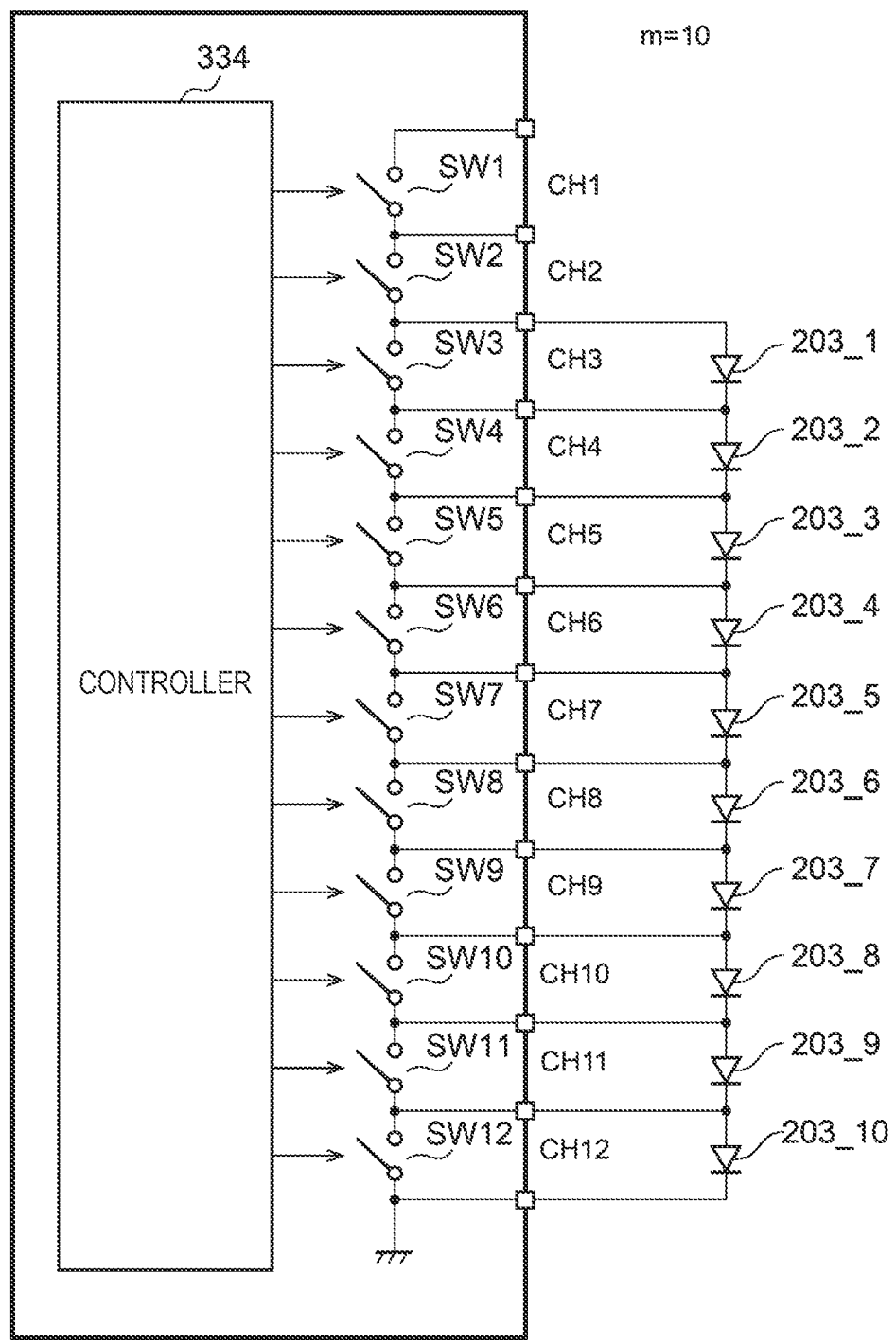
FIG. 11 is a circuit diagram showing the vehicle lamp corresponding to a setting example 4.

FIG. 11 is a circuit diagram showing the vehicle lamp 200C corresponding to the setting example 4. The m (m=10) light-emitting elements 203_1 to 203_10 are connected to the third channel CH3 to the 12th channel CH12.

As shown in FIG. 10B, in this case, the plurality of turn-on commands $S_3$ to $S_{12}$ change in a reverse order of the setting example 2 shown in FIG. 6B, and the light-emitting element 203_12 of the 12th channel CHN is turned on first, and the light-emitting element 203_3 of the third channel CH3 is turned on last. The first channel CH1 and the second channel CH2 are unused channels, and the turn-on commands $S_1$ and $S_2$ are fixed to 0.

The embodiment of the present invention has been described above. The embodiment is intended to be illustrative only and it will be obvious to those skilled in the art that various modifications can be made by combining components and processings of the embodiment are also within the scope of the present invention. Hereinafter, such modifications will be described.

In the vehicle lamp 200C shown in FIG. 5, the power supply circuit 304 may be omitted, and the DC/DC converter 332 may be configured by a step-up converter.

(First Modification)

Although the light adjustment time $\tau_0$ is common to all light sources, the light adjustment time $\tau_0$ is not limited thereto, and may be set individually. In this case, the parameters PARAM includes n second data D2_1 to D2_N corresponding to the number of channels. The i-th second data D2_i defines the turn-on timing of the i-th channel CHi (first mode).

(Second Modification)

Although the relationship $\tau_i \leq \tau_j$ is satisfied on a precondition of i<j in the embodiment, the present invention is not limited thereto. In this case, it is possible to change turn-on commands of the first channel CH1 to the N-th channel in any order.

(Third Modification)

In the configuration shown in FIG. 5, turning-on and turning-off and the luminance of the plurality of light emitting elements 203 are controlled by a so-called bypass method, but the technique according to the present disclosure is not limited thereto. For example, the plurality of light emitting elements 203 may be connected in parallel, a current source may be connected in series to each of the light emitting elements 203, and a current generated by the current source may be changed.

Although components of the lamp control module 300 are housed in the same housing and modularized in the embodiment, the lamp control module 300 is not limited thereto, and may be divided into a plurality of housings, packages, modules, and substrates.

Although the present invention has been described using specific words and phrases based on the embodiments, the embodiments merely show principles and applications of the present invention, and many modifications and arrangement changes can be made to the embodiments without departing from the spirit of the present invention defined in the claims.

The invention claimed is:

1. A vehicle lamp comprising:
    a turn signal lamp light source including a plurality of light emitting elements independently controllable to be turned on and off;
    a nonvolatile memory that stores a parameter for independent control of the plurality of light emitting elements;
    a signal processing device configured to generate, based on the parameter, a plurality of turn-on commands independently indicating turn-on states of the plurality of light emitting elements at each time point by executing a software program; and
    a drive circuit configured to drive each of the plurality of light emitting elements independently based on the plurality of turn-on commands,
    wherein the plurality of light emitting elements of the turn signal lamp light source independently blink in response to a turn synchronization signal from a vehicle that alternately repeats at high and low in a predetermined cycle.

2. The vehicle lamp according to claim 1, wherein the parameter includes a plurality of pieces of first data for defining turn-on timing of each of the plurality of light emitting elements as an elapsed time from a reference time point.

3. The vehicle lamp according to claim 1,
    wherein the parameter further includes second data for defining a light adjustment time starting from when luminance of the plurality of light emitting elements is 0 till the luminance of the plurality of light emitting elements reaches a target value, and
    wherein the signal processing device generates the plurality of turn-on commands indicating the luminance of the plurality of light emitting elements at each time point.

4. The vehicle lamp according to claim 1,
    wherein the drive circuit has an output of N channels, N being not less than 2, and
    wherein the parameter includes third data for defining a number m of the plurality of light emitting elements, m being not larger than N.

5. The vehicle lamp according to claim 1,
    wherein the drive circuit has an output of N channels, N being not less than 2,
    wherein the vehicle lamp is switchable between a first mode in which the light emitting elements are turned on in order from a first channel to an N-th channel and a second mode in which the light emitting elements are turned on in order from the N-th channel to the first channel, and
    wherein the parameter further includes fourth data for designating the first mode and the second mode.

6. The vehicle lamp according to claim 1,
    wherein the plurality of light emitting elements are connected in series, and
    wherein the drive circuit includes
        a constant current circuit configured to supply a drive current to a series connection circuit of the plurality of light emitting elements,
        a plurality of bypass switches connected in parallel with the plurality of light emitting elements, and
        a controller configured to drive the plurality of bypass switches in accordance with the plurality of turn-on commands.

7. A lamp control module used in a vehicle lamp including a turn signal lamp light source provided with a plurality of light emitting elements that independently controllable to be turned on and off, the lamp control module comprising:
    a nonvolatile memory that stores a parameter for independent control of the plurality of light emitting elements;
    a signal processing device configured to generate, based on the parameter, a plurality of turn-on commands independently indicating turn-on states of the plurality of light emitting elements at each time point by executing a software program; and a drive circuit configured to drive each of the plurality of light emitting elements independently based on the plurality of turn-on commands, wherein the plurality of light emitting elements of the turn signal lamp light source independently blink in response to a turn synchronization signal from a vehicle that alternately repeats at high and low in a predetermined cycle.

8. The vehicle lamp according to claim 2, wherein the plurality of pieces of first data defines turn-on timing of each of the plurality of light emitting elements as an elapsed time from a reference time point which coincides with a time point of a positive edge of the turn synchronization signal or is after a predetermined time from the positive edge.

\* \* \* \* \*